United States Patent [19]

Beaman

[11] Patent Number: 4,768,393

[45] Date of Patent: Sep. 6, 1988

[54] VIBRATION DAMPENING COUPLING FOR COMPOUND SHIFT LEVER

[75] Inventor: Gregory A. Beaman, Waterville, Ohio

[73] Assignee: Dana Corporation, Toledo, Ohio

[21] Appl. No.: 32,404

[22] Filed: Mar. 30, 1987

[51] Int. Cl.$^4$ ............... B60K 20/00; G05G 9/00
[52] U.S. Cl. ........................... 74/473 R; 74/523; 403/225
[58] Field of Search ............... 74/523, 473 R, 473 P, 74/566; 403/225, 221; 180/90.6

[56] References Cited

U.S. PATENT DOCUMENTS

| | | | |
|---|---|---|---|
| 1,800,578 | 4/1931 | Webb | 180/90.6 |
| 1,876,709 | 9/1932 | MacPherson | 74/473 P |
| 1,927,646 | 9/1933 | Miller | 74/473 P |
| 2,041,704 | 5/1936 | Gordon et al. | 403/365 X |
| 3,693,467 | 9/1972 | Oehl | 74/473 R |
| 4,492,129 | 1/1985 | Hasegawa | 74/473 R |
| 4,569,246 | 2/1986 | Katayama et al. | 74/523 X |
| 4,603,598 | 8/1986 | Tsuji et al. | 74/523 X |

FOREIGN PATENT DOCUMENTS

| | | | |
|---|---|---|---|
| 58-191015 | 11/1983 | Japan | 74/523 |
| 58-196363 | 11/1983 | Japan | 74/566 |
| 58-203529 | 11/1983 | Japan | 403/372 |
| 59-27328 | 2/1984 | Japan | 74/523 |

Primary Examiner—Gary L. Smith
Assistant Examiner—Rodney M. Lindsey

[57] ABSTRACT

A shift lever including first and second elongated parts includes an improved vibration dampening coupling between the two parts. The coupling enhances the rigidity between the parts under conditions of hard or forceful shift, wherein radial loads normally imparted to elastomer bushings are supported by thermoplastic load-bearing elements positioned adjacent the bushings. In a preferred form, the shift lever includes a first elongated portion and a second hollow body portion secured partially over one end of the first portion. In the preferred form, the elastomer as well as the thermoplastic elements are each defined by an annulus, and while the elastomer elements are adhesively bonded between the first and second parts of the shift lever, the thermoplastic load-bearing elements, which operate to limit deflection of the elastomer elements, are fixed only to one of the shift lever parts. Also in the preferred embodiment, one of the thermoplastic load-bearing elements doubles as a boot retainer for the purpose of supporting a flexible boot assembly at the bottom of a standard shift lever.

4 Claims, 1 Drawing Sheet

VIBRATION DAMPENING COUPLING FOR COMPOUND SHIFT LEVER

BACKGROUND OF THE INVENTION

This invention relates to compound shift levers formed of coupled elongated sections. More particularly, the invention relates to an improved vibration dampening coupling for the sections.

Most of the prior art compound shift levers comprise two sections for the purpose of providing a vibration dampening coupling for isolating transmission gear noise and lever chatter caused by torsionals from the engine through the transmission. Most of such vibration dampening couplings utilize elastomer, which has been found to be quite successful in the isolation of vibration. In the typical two-piece shift lever, a generally hollow section partially overlies a first solid cylindrical section. The couplings, interposed between the two sections, are generally elastomer bushings or "donuts" which must be of a design and composition sufficient to handle and withstand a very high frequency cycle of radial loads over the useful life of the shift lever. Typically, however, the elastomer coupling becomes crazed and brittle over its useful life, and loses its dampening effectiveness. This happens primarily because the shift efforts are fully supported only by the bushings, and there is no backup for rigid and more substantial support available for carrying the radial loads imposed between the two shift lever sections.

SUMMARY OF THE INVENTION

The improved shift lever of the invention herein disclosed provides a radial load-bearing contact system which limits the radial loading otherwise imposed on the elastomer vibration absorption elements in the coupling between shift lever sections. In a preferred form, a two-piece shift lever includes a cylindrical lower-body portion, and a hollow cylindrical upper-body portion partially engaging a first end of the lower-lever portion. Associated with each of a pair of elastomer vibration absorption elements is a load-bearing element of a rigid non-elastomer material, as for example thermoplastic. The latter load-bearing elements have a diameter less than the outside diameters of the vibration absorption elements, and are thus disposed for permitting torsionally induced vibration to be carried by the vibration absorption elements. Thus the radial shift loads will be carried by the load-bearing elements upon radial deflection of the elastomer elements during at least the "hard" shifts of the lever. Also in a preferred form, the vibration absorption elastomer elements are bonded to both first and second portions of the lever, while the thermoplastic load-bearing elements are fixed only to one of the lever portions. This arrangement affords successful vibration absorption and dampening, while providing the support necessary for greater longevity of the elastomer absorption elements.

DETAILED DESCRIPTION OF THE PREFERRED EMBODIMENT

Figure 1:
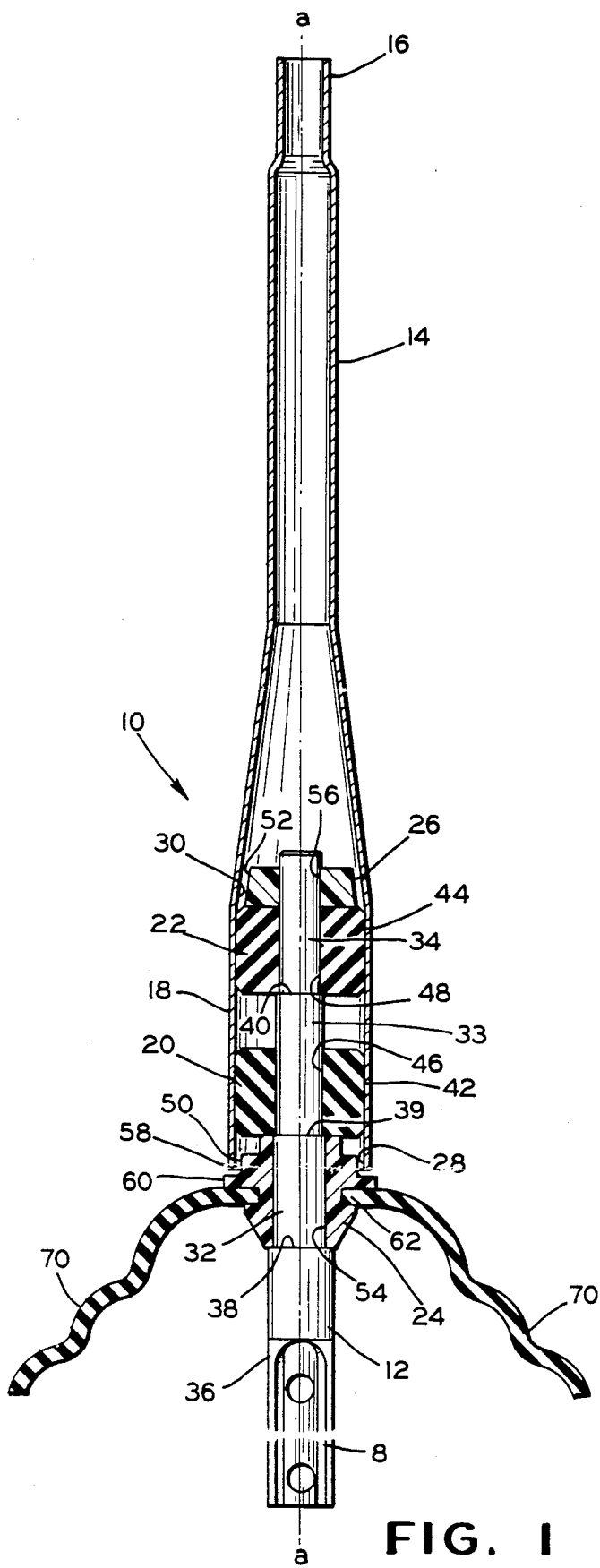
FIG. 1 depicts a cross-sectional longitudinal view of a two-piece shift lever, which includes a first preferred embodiment of the vibration dampening coupling of the present invention.

Referring initialy to FIG. 1, a compound shift lever 10 having a longitudinal axis "a—a" includes a lower lever 12 comprised of a solid elongated metal structural member. The lower lever is coupled to an upper lever 14 comprised of a hollow-bodied elongated sleeve, which is also formed of metal as depicted in the preferred embodiment. Those skilled in the art will appreciate that the upper extremity 16 of the sleeve portion 14 will normally contain a shift knob, not shown in the view depicted herein. A lower end portion 18 of the upper sleeve lever 14 contains a coupling system which includes a pair of elastomer vibration absorption elements 20 and 22. The absorption elements are annular, and are bonded to and hence in constant engagement with both the lower and upper levers 12 and 14 for purposes of vibration dampening between the two levers.

In addition, the preferred embodiment of the present invention includes a pair of thermoplastic load-bearing elements 24 and 26 each of which axially engages one of the pair of elastomer elements 20 and 22. As such, each combination of one thermoplastic element and one elastomer element will operate in concert to provide a radial load-bearing system which affords elastic vibration absorption at all times, while providing a rigid support mechanism between the upper and lower levers during forceful shifting of the shift lever 10. For the latter purpose, the thermoplastic load-bearing elements 24 and 26 will engage the upper lever 14 for support by establishing contact with first and second load-bearing contact portions 28 and 30 on the inner walls of the hollow upper lever 14.

It will thus be seen that the elastomer elements 20 and 22 can only be deflected laterally (or radially) to the extent of actual contact of the contact portions 28 and 30 with the thermoplastic elements 24 and 26, respectively. Hence, the limitation of lateral movement of the upper lever 14 with respect to the lower lever 12 will be effective to enhance the life of the elastomer members 20 and 22. Of course, the outside diameters 50 and 52 of the thermoplastic elements 24 and 26 must be sized so as to permit sufficient vibration dampening by the elastomer elements 20 and 22 without permitting chatter between the upper lever 14 and the thermoplastic elements 24 and 26. Moreover, the thermoplastic elements 24 and 22, as noted, are preferably designed to contact the lever 14 only upon hard or difficult shift.

The present invention will also accommodate a more positive axial coupling arrangement between the various members of the shift lever apparatus 10. Thus, it will be seen that the lower lever 12 is comprised of a series of reduced diameter sections 32, 33, and 34 relative to the overall outside diameter of the lower end of the lever 36. A first shoulder 38 is defined by the interface between sections 32 and 36, while a second shoulder 40 is defined by the interface between sections 33 and 34. A third shoulder 39 is defined by the interface between sections 32 and 33, and results from a special feature explained below.

It will be appreciated by those skilled in the art that this arrangement will assure a system having an inherent axial stop or bias against movement of the elastomer and thermoplastic elements downwardly toward the transmission coupling end 8 of the lower lever 12. The latter represents one possible failure mode of transmission compound shift levers.

In the preferred form, each of the elements 20, 22, 24, and 26 is annular in shape, and each is rigidly affixed to the lower lever 12 by its inner diameter. Hence, the inner diameters 46 and 48 of the first and second elastomer elements 20 and 22 are bonded to the sections 33 and 34, respectively of the lower lever 12, while the inner diameters 54 an 56 of the first and second thermoplastic elements 24 and 26 are press-fit to shaft sections 32 and 34. Ideally, the outside diameters 50 and 52 will be sized and positioned so as to engage and support the contact portions 28 and 30 substantially simultaneously.

It will be noted that the compound shift lever 10 is fabricated of only six parts. As previously noted, the lower and upper levers 12 and 14 are both fabricated of metal in the preferred embodiment described herein. The steps of manufacture are quite simple and easily carried out. First, adhesive is applied to the reduced diameter sections 33 and 34 of the lower lever 12. The first thermoplastic load-bearing element 24 is then slipped over the top end of the lever 12 to its final position against the first shoulder 38 as shown. Next, the first elastomer vibration absorption element 20 is slipped over the lever 12 to the position as shown abutting the first thermoplastic element 24. Next, the second elastomer element 22 is installed against the second shoulder 40 as shown. The second thermoplastic element 26 is installed against the second elastomer element 22. The third shoulder 39 is a result of ensuring that the element 24 will slip easily over the lever 12, and yet achieve a tight press-fit over the reduced section 32. This aspect provides greater ease of assembly, to the extent that the effort to press-fit element 24 is only required in the region of its final location.

To complete the assembly, adhesive is applied to the outside diameters 42 and 44 of the first and second elastomer elements 20 and 22, and the upper-sleeve lever portion 14 is finally installed over the lower lever subassembly to a position which insures a small gap between the lower extremity 58 of the upper lever 14 and a flange portion 60 on the first thermoplastic element 24.

It will be appreciated that for proper assembly, the outside diameters 42 and 44 of the elastomer elements 20 and 22 will approximate the inside diameter of the lower-end portion 18 which contacts those elements. However, as has been noted, the outside diameters 50 and 52 of the first and second thermoplastic elements 24 and 26 will be smaller than the internal diameters of the contacting portions 28 and 30. This will be necessary in order to assure a radial clearance for proper operation of the assembly. As also previously noted, the first thermoplastic element 24 doubles as a boot retainer, and includes for this purpose an annular groove 62 for proper retention of a lower lever cover boot shown at 70.

In the presently preferred embodiment, the coupling end 8 of the lower lever 12 is formed of a solid bar of stock having a square cross-section. The bar is turned at its upper portion to generate the reduced diameter sections 32, 33 and 34. The square coupling end 8 is then milled, drilled and tapped. Also for the presently preferred embodiment, one suggested adhesive for bonding the upper lever 14 to the elastomer elements 20 and 22 is "Black Max" ® by Loctite Corporation. The latter adhesive is thermally durable as well as resistant to automotive fluids, and is preferred over a number of alternatives.

Figure 2:
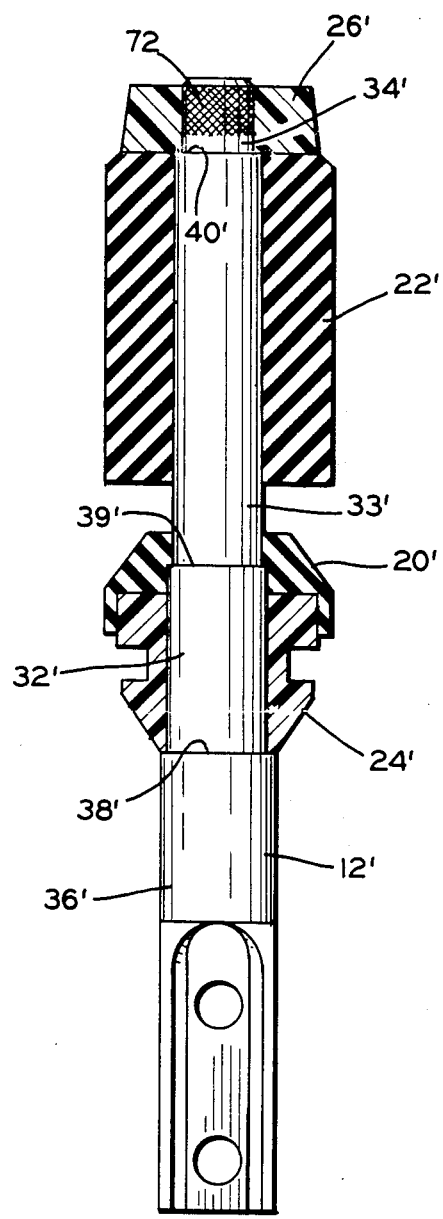
FIG. 2 is a cross-sectional view of a lower lever sub-assembly which incorporates a second preferred embodiment of the vibration dampening coupling.

Referring now to FIG. 2, a second preferred embodiment of the vibration dampening coupling is shown. Normally the upper elastomer element 22, 22' will carry the routine shifting loads imposed between the upper and lower lever portions. Thus, this embodiment recognizes that aspect by enlargening the upper elastomer element 22'. In addition, the smaller lower elastomer element 20' of FIG. 2 includes an annular portion which overlies the lower thermoplastic element 24' to avoid physical contact between the upper lever sleeve portion (not shown) and the element 24'. This optional feature operates to minimize noise and vibration transmission during actual shift efforts.

Finally, the alternate embodiment of FIG. 2 also contains an optional knurled portion 72 on the reduced diameter section 34' which enhances friction between that section and the theroplastic element 26'.

This invention thus provides a compound shift lever 10 which contains no mechanical locks, and relies only upon positive mechanical support. In addition, only adhesive coupling is required, hence no fasteners of any type are either desired nor included. A more durable compound shift lever is achieved which is capable of providing a greater vibration dampening longevity than many prior art shift levers.

Although only two preferred embodiments have been detailed and described herein, the following claims are envisioned to cover numerous other embodiments which will fall within the spirit and scope thereof.

What is claimed is:

1. In a shift lever comprising a first elongated portion having coupling means secured thereto, said lever also comprising a second elongated portion defining a hollow body being partially disposed over one end of said first portion and being radially supported about said one end by said coupling means, said coupling means comprising elastomer vibration absorption means secured to and radially interposed between said first and second portions; an improvement wherein said coupling means further comprises a pair of spaced rigid non-elastomer load bearing elements, also radially interposed between said first and second portions, each load-bearing element disposed for limiting radial deflection of said absorption means under application of a radially directed external load to said second portion of said lever, wherein said vibration absorption means comprises a pair of spaced vibration absorption elements, wherein said hollow body of said second lever portion comprises load-bearing element contact portions on its inside diameter surface, and wherein each of said load-bearing elements comprise a smaller diameter than that of said vibration absorption elements, whereby under a given amount of radial deflection of said absorption elements, one of said contact portions will engage one of said load-bearing elements, wherein each of said load-bearing elements and vibration absorption elements comprise an annulus defining an inner and outer diameter, each load-bearing element having its inner diameter in contact with and press-fit to said first portion of said lever and its outer diameter spaced from said second portion of said lever, wherein each absorption element has its inner diameter in contact with and bonded to said first portion of said lever, and its outer diameter in contact with and bonded to said second portion of said lever, wherein said diameter of each of said load-bearing elements is smaller than the diameter of each associated hollow-body element contact portion, wherein said first and second load-bearing elements are sized and positioned to engage and support said second lever portion substantially simultaneously, wherein said first elongated portion defines a substantially cylindrical body including a plurality of reduced diameter sections along the length thereof, each section defining a spaced pair of integral annular shoulders, and wherein one of said pair of load-bearing elements comprises a boot retainer groove, and has one end thereof in direct engagement with a first of said shoulders of said first lever portion, and wherein one of said pair of vibration absorption elements is in direct engagement with the opposite end of said one of said pair of load-bearing elements, and wherein the other of said pair of vibration absorption elements has one end in direct engagement with a second of said shoulders of said first lever portion, and the other of said pair of load-bearing elements is juxtaposed against the opposite end of said second of said pair of vibration absorption elements.

2. The shift lever of claim 1 wherein said reduced diameter sections of said first lever portion become progressively reduced in diameter along a direction in which said first shaft extends into said lower end of said second lever portion.

3. The shift lever of claim 2 wherein said first and second lever portions comprise metal and each of said load-bearing elements comprise a thermoplastic material.

4. The shift lever of claim 3 wherein said elastomer is bonded to said metallic lever portion by a thermally durable and fluid resistant adhesive.

* * * * *